July 20, 1965

A. ABOLINS 3,196,267

CLEARANCE LIGHT FOR TRAILERS

Filed Feb. 8, 1963

INVENTOR.
ANDREW ABOLINS
BY
Millman and Jacobs
ATTORNEYS.

July 20, 1965  A. ABOLINS  3,196,267
CLEARANCE LIGHT FOR TRAILERS
Filed Feb. 8, 1963  2 Sheets-Sheet 2

INVENTOR.
ANDREW ABOLINS
BY
Millman and Jacobs
ATTORNEYS.

3,196,267
CLEARANCE LIGHT FOR TRAILERS
Andrew Abolins, Penndel, Pa., assignor to Strick Trailers, a Division of Fruehauf Trailer Co., Philadelphia, Pa., a corporation of Michigan
Filed Feb. 8, 1963, Ser. No. 257,285
10 Claims. (Cl. 240—8.2)

This invention relates to lights in general but more particularly to clearance lights for trailers.

For safety reasons trailer bodies are required to be equipped with clearance lights towards the top thereof along the sides, front and rear. One type of trailer body in widespread commercial use employs top rails along the sides to support a roof and engage the side panels and posts, which top rails are formed with outwardly opening channels in which the clearance lights are mounted for ready access by the operator to replace bulbs, lenses, etc. The lights presently mounted in such top rails have several disadvantages among which is the fact that the lights are frequently damaged by sweeping tree branches, bulb replacement is troublesome and often requires use of tools to first remove the lens, shorts occur in the electrical connections to the lights, the lenses pop off due to the build up of internal pressure in the light housing and the lights are generally too dim. The primary object of the instant invention is to provide a clearance light which overcomes the aforementioned disadvantages.

Another object of the invention is to provide a clearance light for trailers employing an insulating flexible bulb-retaining housing which acts as a shock mounting between the bulbs and the trailer body thereby increasing bulb life. The flexible housing also serves to expand under increased internal pressure thereby relieving the pressure on the lens itself.

Another object of the invention is to provide a clearance light for trailers with an insulating flexible housing having means to grip the bulbs so tightly as to minimize shock loads due to play of the bulbs in the sockets. By using a white elastomer, the housing also becomes a very good reflective surface thereby brightening the light.

Another object of the invention is to provide a clearance light for trailers employing an insulating flexible housing having means to removably mount the light bulbs at the top thereof so that water will drain away from the bulbs and at such an angle as to minimize shock load on the bulb filaments.

Another object of the invention is to provide a clearance light for trailers in which a flexible insulating bulb-mounting housing and a lens retainer interengage in such a manner as to create an effective seal against rain and foreign matter.

Another object of the invention is to provide a clearance light for trailers in which the lens retainer comprises a bracket into which the lens fits and a locking spring therefor which is hinged to the bracket, the construction being such that the spring cannot be released or unlocked except by the application of pressure simultaneously at three points so that the lens cannot be slid sidewise or the spring unlocked by impact of tree branches.

Another object of the invention is to provide a clearance light for trailers in which the lens retainer comprises a bracket into which the lens fits and a locking spring therefor which is hinged to the bracket, the lens being provided with a means to retain it on the spring during movement thereof to the unlocked position and the bracket being provided with a sloping deflector to take the impact of sweeping tree branches and thereby prevent them from striking the lens itself with any effective force. When used with the outwardly opening top rail mentioned hereinbefore, the lens and its retaining bracket completely cover the bulb-mounting housing and also shields all leads to the light bulbs.

These and other objects of the invention will become more apparent as the following description proceeds in conjunction with the accompanying drawings, wherein.

Specific reference is now made to the drawings in which similar reference characters are used for corresponding elements throughout.

Figure 2:
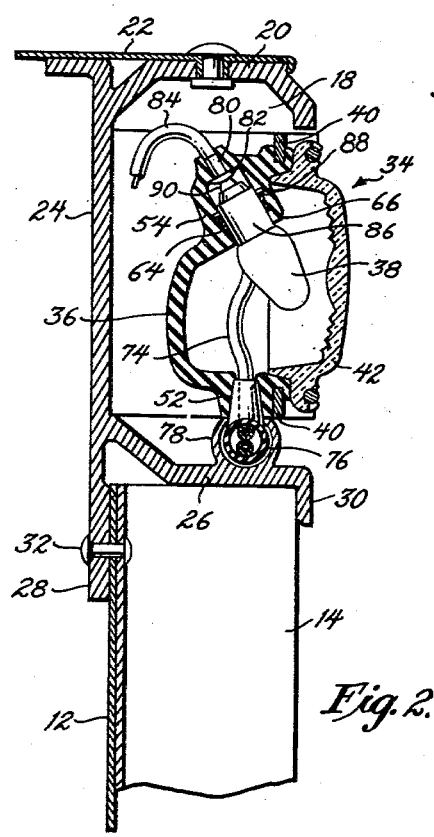
FIG. 2 is an enlarged sectional view taken on the line 2—2 of FIG. 1.
Figure 1:
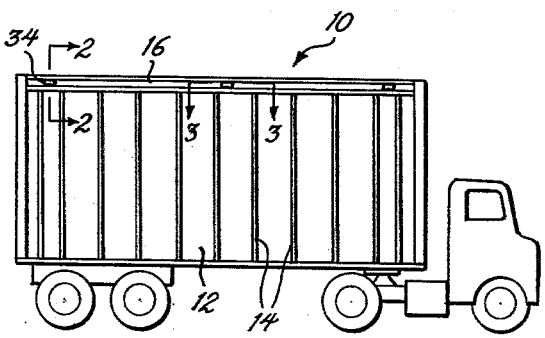
FIG. 1 is a diagrammatic side elevational view of a trailer embodying the invention.
Figure 6:
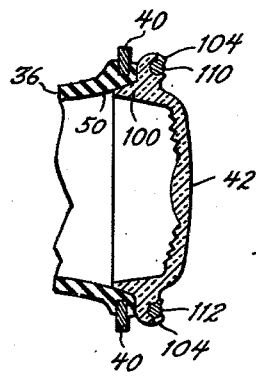
FIG. 6 is a fragmentary vertical sectional view substantially centrally through the housing, lens, mounting bracket and retainer.

Indicated generally at 10 is a conventional trailer body having side panels 12 which are appropriately secured upon and between spaced vertical posts 14. Longitudinal top rails 16 are provided along the sides of the body the same preferably being an extruded metallic member having a channel portion 18 which opens outwardly of the body. This channel portion includes an upper horizontal flange 20 upon which the roof 22 is secured, a vertical web portion 24 and a lower horizontal flange portion 26. The latter flange cooperates with depending flanges 28 and 30 to receive and secure as at 32 the upper ends of the vertical posts 14 and side sheets or panels 12.

The lights 34 of the instant invention are mounted in the channel 18 of the top rail at desired locations and are electrically connected by appropriate leads to the electrical system in the trailer to provide clearance lights along the top of the body. Each light comprises a flexible insulating housing 36 to mount the bulbs 38, a metallic bracket 40 to mount the housing, a lens 42 and a spring 44 to removably retain the lens on the bracket selectively in front of or away from the housing.

Figure 5:
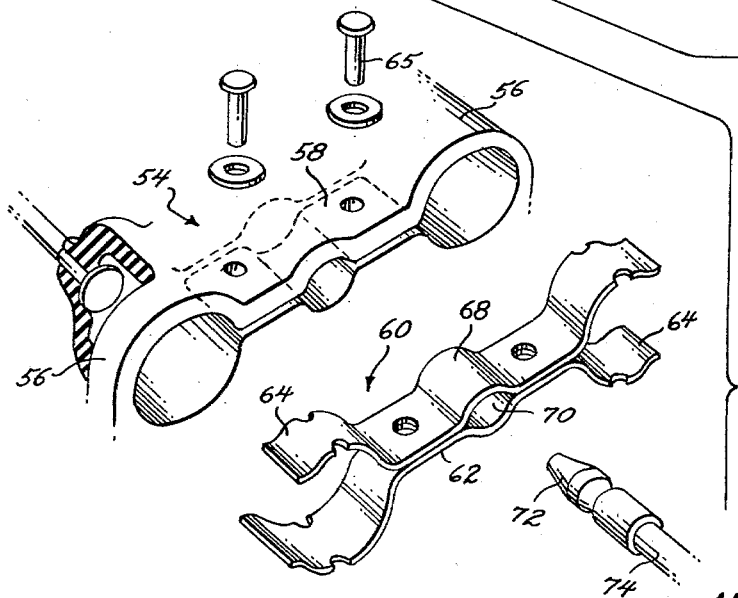
FIG. 5 is an exploded perspective view of a detail of construction.

Coming first to the housing, it is molded of an elastomeric material, such as neoprene and is preferably white for improved reflection. It is molded in substantially cup-shaped form with a pair of spaced beads 46 forming a groove 48 therebetween peripherally around the open end 50 of the housing. The bottom wall of the housing is formed with an enlarged portion having a vertical through bore 52 whereas the upper wall includes an enlarged depending member 54, see FIG. 5, having spaced cylindrical portions 56 connected by a slit web portion 58. The axes of the cylindrical portions are substantially 25° to the vertical.

A metallic terminal is provided consisting of complementary springs 60. When joined they form a web portion 62 corresponding to the web portion 58 and split substantially cylindrical collars 64. When the springs 60 are pushed into the member 54 as suggested in FIG. 5 and secured therein via rivets and washers 65 through the web portions, the split collars 64 become disposed in the cylindrical portions 56 in a position where an inwardly curving lip portion 66 of each portion 56 extends beyond the spring terminal 60, as seen in FIG. 2. The web of the springs 60 also form a female socket 68 with a detent 70 for quick connect-disconnect coupling with the male end 72 of a harness lead 74, the latter extending through the bore 52 of the housing and being a branch of one of the two wire conduit 76 in the conduit channel 78 formed in the lower horizontal flange portion 26 of the channel 18 of the top rail. A pair of bores 80 are formed through the rear of member 54 in which are mounted the headed contacts 82 at the ends of the ground wires 84.

The bulbs 38 each include a metallic band 86 with diametrically extending pins 88 so that when they are pushed into the cylindrical portions until the pins clear the rear edges of the spring collars 64 and are turned, the bulb is locked in place with its end contact 90 touching the ground contact 82 and its metallic band 86 touching the split spring collars 64. In this position, it will be seen that the lip 66 grips the bulb collar 86 beyond the spring collars 64 thereby eliminating shock loads due to play of the bulbs in the sockets. Also, the 25° inclination of the long axis of the bulb filament increases bulb life because the direction of the shock load on the filament is itself inclined due to the arcuate motion of the bulb under vertical impact. By locating the bulbs at the top of the housing, water drainage is desirably away from the bulbs and through a drain hole (not shown) in the housing.

The attaching bracket 40 includes a front face 92 with a cut-out portion 94 corresponding in shape and size to the housing groove 48. One end 95 of the bracket is L-shaped and is secured as at 96 to the vertical web portion 24 of top rail whereas the other end of the bracket is deflector plate 98 which is attached as at 101 to the top rail portion 24 and is inclined towards the front of the trailer. Before the bracket is secured in the channel 18 of the top rail, the housing 36 is pushed into the cut-out portion 94 until the edges thereof button into the groove 48 between the peripheral beads 46. Thus the housing is in effect a flexible or shock mount between the bulbs and the trailer top rail.

The lens 42 includes a tapered or sloping flange 100 whose periphery at its wide end slightly exceeds the maximum periphery of the housing opening 50. The lens also includes upper and lower longitudinal open grooves 102 and flexible side-opening lips 104 extending from their upper and lower sides.

Figure 3:
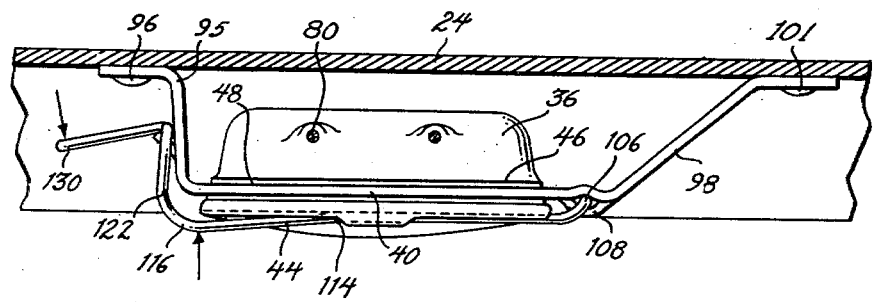
FIG. 3 is a top plan view looking down from line 3—3 on FIG. 1, with parts broken away to show details of construction.
Figure 4:
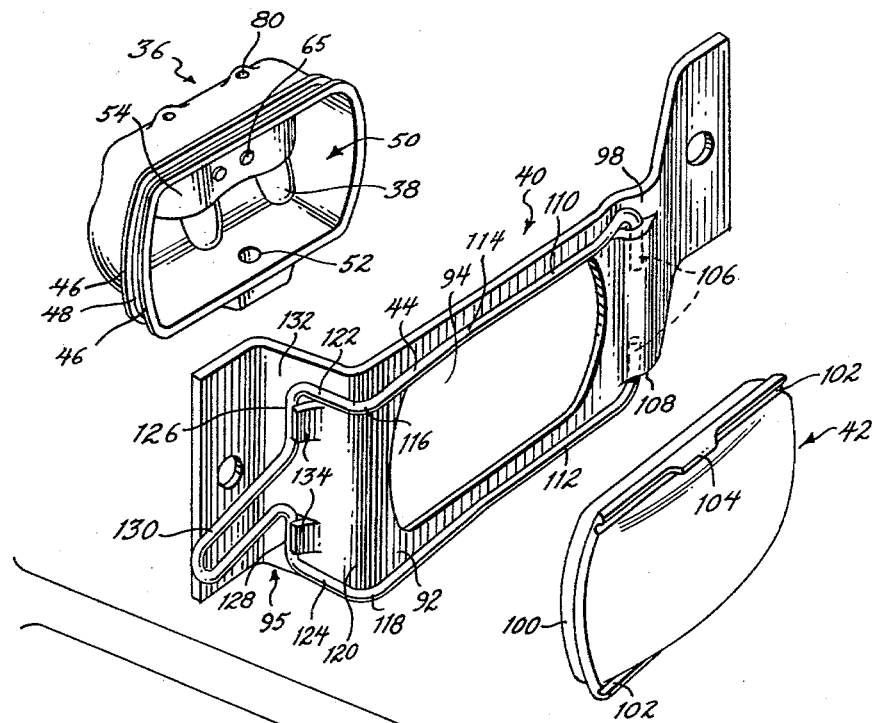
FIG. 4 is an exploded perspective view of the clearance light.

The retaining spring 44 is a wire with split ends 106 that can be spread apart and slipped into journals 108 in the bracket near the deflector plate 98 to form a hinge connection therefor. The wire also includes two spaced longitudinal portions 110 and 112 which are reversely bent or indented medially thereof as at 114. The wire portions 110 and 112 are pushed into the lens grooves 102, at which time the lips 104 snappingly hook over and retain the said wire portions. The portions 110 and 112 are bent to form corners 116 and 118 which extend around the corner 120 where the L-shaped member 95 of the bracket joins the front plate 92, as seen in FIGS. 3 and 4. This bending of the portions 110 and 112 into the corners 116 and 118 produces portions 122 and 124 which are substantially perpendicular to portions 110 and 112 and then these portions 122 and 124 are inwardly bent to provide further portions 126 and 128 which are perepndicular to portions 122 and 124. These portions 124 and 126 are again bent and join to form a longitudinally extending handle 130. The face 132 of the L-shaped member 95 contains outstruck latches or detents 134 to releasably engage the portions 126 and 128 of the wire retainer.

Since the lips 104 of the lens are snappingly hooked over the longitudinal portions 110 and 112 and the portions 110 and 112 of the retainer are positioned in the lens grooves 102, the lens is associated with the retainer at all times and is not a separate piece. When the handle 130 is pushed to the locking position as seen in FIG. 3, the portions 126 and 128 hook over the detents 134 with the reversely bent or indented portions 114 of the retainer 44 applying pressure inwardly against the lens 42. This forces the tapered flange 100 of the lens to enter the flexible housing through its opening 50 and spread it slightly by a wedging action to effect a tight seal. The locking action is such that the retainer cannot be released by the mere exertion of a pull on the handle 130. Release or unlocking of the retainer can be effected by pressing inwardly against the raised corners 116 and 118 to flex the portions 126 and 128 while a pull is exerted outwardly on the handle 130.

When the retainer is unlocked, the lens 42 moves with it and is retained thereon by the lips 104 so that the operator need not be concerned with laying the lens down separately and carefully. In this manner also access can be readily had to the bulbs for replacement without the need for the operator to use tools or be concerned with laying down screws, etc.

It will also be noted that the mounting bracket desirably extends between the upper and lower horizontal flanges 20 and 26 of the channel 18 of the top rail and the bottom of the flexible housing extends to the lower horizontal flange 26 where its bore 52 communicates with the conduit groove 78. This construction acts to shield the harness and leads so that there are no external connections which are exposed to corrosion or can be caught by sweeping branches. The plate 98 inclining as it does towards the front of the trailer body will take the impact of sweeping branches and prevent them from striking the lens with a force of any serious magnitude. Nor can such sweeping branches even if they should manage to strike the lens, shift the lens sidewise or cause the retainer to open since an inward pressure at two points and an outward pull at a third, as aforementioned, is required to do so. In the event that internal pressure is built-up in the housing (as is not uncommon), the lens will not pop off as the flexible housing 36 will expand under the pressure. Moreover, pressure from the inside against the lens cannot push it off because of the nature of the action required to unlock or release the spring retainer 44.

I claim:

1. A clearance light for a vehicle comprising a generally cup-shaped flexible insulating housing open at one face, at least one bulb, means mounting said bulb in said housing, said vehicle including a member having a cut-out portion corresponding to the open face of said housing, an external groove peripherally around said housing adjacent said open face and receiving the peripheral edge of said cut-out portion, a lens corresponding to said open face and extending beyond the periphery of said cut-out portion, and means to releasably retain said lens in a position to close off said open face, said lens including a flange spaced from the peripheral edge of said lens extending into said housing through said open face and intersecting the locus of said groove when said lens is retained in said closed position, said flange having a face which engages the inner face of said housing and compresses it thereby tightening the engagement of said peripheral edge of said cut-out portion in said groove.

2. A clearance light for a vehicle comprising a generally cup-shaped flexible insulating housing open at one face, at least one bulb, means mounting said bulb in said housing, said vehicle including a member having a cut-out portion corresponding to the open face of said housing, an external groove peripherally around said housing adjacent said open face and receiving the peripheral edge of said cut-out portion, a lens corresponding to but larger than said open face, and means to releasably retain said lens in a position to close off said open face, said lens including a flange spaced from the peripheral edge of said lens extending into said housing through said open face engaging the inner face of said housing and intersecting the locus of said groove when said lens is retained in said closed position, said bulb including an end contact adapted to engage a ground wire and a metallic band adjacent thereto, said means mounting said bulb including a split collar engaging said band and adapted for operative connection to a harness lead, said split collar and band being received in a socket in said housing whereby the wall of said socket urges said split collar into gripping engagement with said band and restrain vibration of said bulb.

3. The combination of claim 2 wherein said socket includes a lip extending beyond said split collar and confining the same.

4. A clearance light for a vehicle comprising a generally cup-shaped flexible insulating housing open at one face, at least one bulb, means mounting said bulb in said housing, said vehicle including a member having a cut-out portion corresponding to the open face of said housing, an external groove peripherally around said housing adjacent said open face and receiving the peripheral edge of said cut-out portion, a lens corresponding to but larger than said open face, and means to releasably retain said lens in a position to close off said open face, said lens including a flange spaced from the peripheral edge of said lens extending into said housing through said open face and intersecting the locus of said groove when said lens is retained in said closed position, said flange having a face which engages the inner face of said housing and compresses it thereby tightening the engagement of said peripheral edge of said cut-out portion in said groove, said lens retaining means including an elongated spring member hinged at one of its ends to said vehicle member and having a portion extending across said lens, and detent means on said vehicle member releasably engaging the other end of said spring member.

5. The combination of claim 4 wherein said portion of said spring member which extends across said lens is medially bent towards said lens and coacts with said detent means to exert a force urging said flange into said housing.

6. A clearance light for a vehicle comprising a generally cup-shaped flexible insulating housing open at one face, at least one bulb, means mounting said bulb in said housing, said vehicle including a member having a cut-out portion corresponding to the open face of said housing, an external groove peripherally around said housing adjacent said open face and receiving the peripheral edge of said cut-out portion, a lens corresponding to but larger than said open face, and means to selectively position said lens to open and close said open face of said housing, said last-named means including an elongated spring member hinged at one of its ends to said vehicle member and having a portion extending across said lens, means on said lens engaging and removably retaining said portion of said spring on said lens so that said lens remains attached to said spring during pivotal movement thereof, and detent means on said vehicle member releasably engaging the other end of said spring member to hold said lens in its closed position.

7. The combination of claim 6 wherein said means engaging and retaining said portion of said spring member on said lens includes a groove in said lens receiving said portion and a lip hooking over said portion to releasably retain the same in said groove.

8. A clearance light for a vehicle body including a wall member comprising a flexible insulating housing open at one face, at least one bulb mounted therein, a bracket secured to said wall member of said vehicle body and including a cut-out portion corresponding to said open face of said housing, means mounting said housing on said bracket with said cut-out portion confronting said open face, a lens corresponding to and adapted to close off said open face of said housing, and means to retain said lens in said position to close off said open face of said housing, said bracket including a deflecting plate having a continuous surface inclined outwardly of said wall member and to one side of said cut-out portion, the outermost portion of said plate extending beyond the exposed face of said lens, said surface being at least as wide as the exposed portion of said lens so that said lens is protected from contact with tree branches.

9. A clearance light for a vehicle body having a wall member comprising a flexible insulating housing open at one face, at least one bulb mounted therein, a bracket having a front face and inwardly extending front and rear end members, said front face including a cut-out portion corresponding to said open face, means securing said end members of said bracket on said wall member, means mounting said housing on said bracket with said cut-out portion confronting said open face, a lens corresponding to said open face of said housing, means to releasably retain said lens in position to close off said open face, said means including a wire of generally rectangular shape hinged at one of its ends to said bracket adjacent said front bracket end member and extending across said lens and a detent extending outwardly of said rear bracket end member, the non-pivoted end of said wire being bent inwardly to extend along said rear bracket end member and including a transverse portion engageable with said detent.

10. The combination of claim 9 wherein said wire is medially bent and coacts with said detent to urge said lens towards said housing in the closed position, release of said transverse portion of the free end of said wire from said detent being effected by exerting a longitudinal stretch on said wire adjacent its non-pivoted end.

References Cited by the Examiner

UNITED STATES PATENTS

| 1,876,852 | 9/32 | Carbonara | 240—41.55 X |
| 2,113,553 | 4/38 | Dover | 240—41.55 X |
| 2,184,208 | 12/39 | Brown et al. | 240—8.2 |
| 2,208,155 | 7/40 | Daehler | 240—7.1 |
| 1,707,747 | 5/55 | De Frees | 240—7.1 |
| 2,903,570 | 9/59 | Worden | 240—8.2 X |
| 2,991,116 | 7/61 | Andrews | 240—7.1 X |
| 3,017,501 | 1/62 | Tantlinger | 240—8.2 |
| 3,087,051 | 4/63 | Black | 240—7.1 |

NORTON ANSHER, *Primary Examiner.*